United States Patent Office 3,337,565
Patented Aug. 22, 1967

3,337,565
α-(3-PYRIDYL)-β-HYDROXY-α-(SUBSTITUTED PHENYL)-ACRYLONITRILE AND DERIVATIVES THEREOF
William Laszlo Bencze, New Providence, and Gordon Northrop Walker, Morristown, N.J., assignors to Ciba Corporation, New York, N.Y., a corporation of Delaware
No Drawing. Filed July 23, 1965, Ser. No. 474,484
12 Claims. (Cl. 260—294.9)

This is a continuation-in-part of application Ser. No. 466,827 filed June 24, 1965.

The present invention concerns and has for its object the provision of β-hydroxy-acrylic acid derivatives of the formula

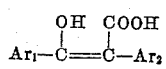

in which one of the radicals $Ar_1$ and $Ar_2$ stands for a mono- or bicyclic heterocyclic aryl radical and the other for a mono- or bicyclic carbocyclic aryl radical, the enol ethers and esters thereof and the acid esters, amides and the nitrile, as well as salts of these compounds, with the provision that in the corresponding nitriles in which $Ar_1$ represents 2-, 3- and 4-pyridyl, a phenyl radical $Ar_2$ contains at least one additional substituent, and methods for their preparation.

A heterocyclic aryl radical is, for example, an aza-, oxa- and/or thiacyclic aryl radical, preferably a mono-azacyclic aryl radical, such as a 2-, 4- or especially 3-pyridyl radical, but also, for example, a 2- or 3-pyrryl, 3- or 4-pyrazyl, 2-, 4- or 5-imidazolyl, 2- or 3-furyl, 2- or 3-thienyl, 2-, 4- or 5-oxazolyl or thiazolyl, 3-, 4- or 5-isoxazolyl or isothiazolyl, 3- or 4-pyridazinyl, 2-, 4- or 5-pyrimidyl, 2-pyrazinyl, 2- or 3-indolyl, 1- or 3-isoindolyl, 2-, 3-, 4- or 8-quinolyl or 1-, 3-, 4- or 7-isoquinolyl radical.

A carbocyclic aryl radical is preferably a phenyl radical, but may also stand for a 1- or 2-naphthyl radical. These aromatic radicals $Ar_1$ and $Ar_2$ are unsubstituted or may or must contain one or more than one of the same or of different substituents, such as lower alkyl or aralkyl, e.g. methyl, ethyl, n- or i-propyl, n-, i-, sec.- or tert.-butyl; benzyl, 1- or 2-phenyl-ethyl or 2-phenylpropyl-(2), lower alkoxy, e.g. methoxy, ethoxy, n- or i-propoxy or n-butoxy, lower alkylmercapto, e.g. methyl- or ethylmercapto, halogen, e.g. fluoro, chloro or bromo, trifluoromethyl, nitro and/or amino, such as di-lower alkylamino, e.g. dimethylamino or diethylamino. These alkyl, alkoxy, alkylmercapto, halogen, trifluoromethyl, nitro and amino substituents may also be present in the aromatic portion of the aralkyl radicals mentioned above.

An enolether is, for example, such derived from an aliphatic or araliphatic alcohol, such as a lower alkanol or aralkanol, e.g. methanol, ethanol, n- or i-propanol, n-butanol or benzyl alcohol. An enol ester is preferably that of a carboxylic or sulfonic acid, such as a lower alkanoic or lower alkane or benzene sulfonic acid, e.g. formic, acetic, propionic, butyric, pivalic, methane sulfonic, ethane sulfonic or p-toluene sulfonic acid.

An ester of the present β-hydroxy-acrylic acids is preferably such derived from the above-mentioned aliphatic or araliphatic alcohols. A corresponding amide may be the unsubstituted amide or a mono- or di-lower alkylamide in which lower alkyl has the meaning given above.

The compounds of the present invention have valuable pharmacological properties. For example, they interfere with the carbohydrate metabolism and cause a fall in the sugar content of the blood. This can be demonstrated, for example, in glucose primed intact or adrenalectomized rats over an oral dosage range between about 10 to 200 mg./kg. They are, therefore, useful as hypoglycemic agents, preferably for oral administration. They are also useful starting materials or intermediates in the manufacture of other valuable compounds, especially medicines.

Particularly useful are the compounds of the formula

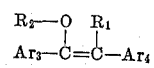

in which one of the radicals $Ar_3$ and $Ar_4$ stands for 2-, 3- or 4-pyridyl, 2- or 3-furyl, 2- or 3-thienyl, 2-, 3- or 4-quinolyl, 1-, 3- or 4-isoquinolyl, or one of these radicals containing one or two substituents selected from lower alkyl, lower alkoxy and halogeno, and the other for phenyl, 1- or 2-naphthyl or one of these radicals containing one or two substituents selected from lower alkyl, lower alkoxy, lower alkylmercapto, halogeno, trifluoromethyl, nitro, amino and di-lower alkylamino, $R_1$ for cyano, carbamyl, lower alkylcarbamyl, N,N-di-lower alkylcarbamyl and carbo-lower alkoxy and $R_2$ for hydrogen, lower alkyl or lower alkanoyl, provided they fit under the condition mentioned in the beginning.

Compounds that are specially valuable are those of the formula

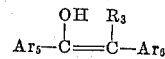

in which one of $Ar_5$ and $Ar_6$ stands for 2-, 4- or especially 3-pyridyl or (lower alkyl)-pyridyl and the other for phenyl, (lower alkyl)-phenyl, (lower alkoxy)-phenyl, (halogeno)-phenyl or (trifluoromethyl)-phenyl and $R_3$ for carbamyl or cyano, provided that in the β-pyridyl-β-hydroxy-acrylonitriles $Ar_6$ is different from phenyl.

Above all, the present invention concerns compounds having the formulae

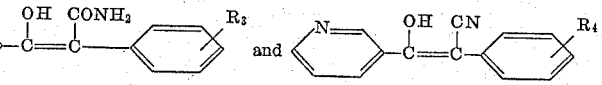

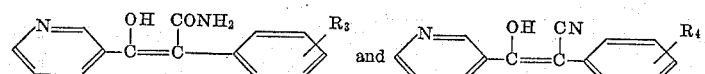

in which $R_3$ stands for hydrogen or $R_4$, and $R_4$ for lower alkyl, lower alkoxy, halogeno or trifluoromethyl.

The compounds of the invention are prepared according to known methods, for example by (a) Reacting an ester, halide or anhydride of the acid $Ar_1$—COOH with an ester, amide or the nitrile of the acid $Ar_2$—CH$_2$—COOH or a reactive metal derivative thereof or (b) Hydrolyzing a compound of the formula

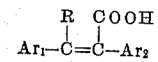

or an ester, amide or the nitrile thereof, in which R stands for an amino group or a halogen atom or (c) Isomerizing a compound of the formula

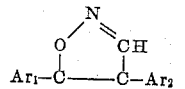

with a base or (d) Reacting a compound of the formula

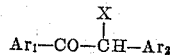

or an enolether or ester thereof, in which X stands for a halogen atom, with a cyanide or a reactive functional derivative of formic acid or (e) Reacting a compound of the formula

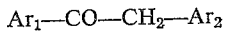

or a reactive metal derivative thereof, with a halocyan or an aliphatic or araliphatic haloformiate or halooxalate and decarbonylating any glyoxalate obtained and, if desired, converting a free compound obtained into an enol ether or ester, an acid ester, amide, nitrile or salt thereof or converting a corresponding functional derivative or salt thereof into the free compound or into another of said derivatives and/or separating a mixture of isomers into the single isomers.

An ester of the carbocyclic or heterocyclic acid

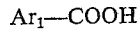

is preferably that of an aliphatic or araliphatic alcohol, for example of those mentioned above, a halide is preferably the chloride or bromide and an anhydride a pure or mixed anhydride. An ester of the acid $Ar_2$—$CH_2$—COOH is, for example, also that of the above-mentioned aliphatic or araliphatic alcohols, whereas its amide preferably is derived of a secondary amine, such as a di-lower alkylamine. Reaction (a) is preferably performed with the corresponding nitrile and in the presence of a condensing agent, for example an alkali metal, e.g., lithium, sodium or potassium, or an alcoholate thereof, advantageously a lower alkanolate, e.g. methanolate, ethanolate, n- or i-propanolate, n- or tert. butanolate, or an amide or hydride thereof or any other condensing agent useful in Claisen condensations. The acid halide is preferably reacted with the metal derivative whereas the acid anhydride advantageously is reacted in the presence of a Lewis acid, e.g. boron trifluoride.

The esters or amides of the starting material mentioned under (b) are, for example, those mentioned for the final products. An amino group R therein may be unsubstituted or substituted, preferably disubstituted, and represents, for example di-lower alkylamino or advantageously lower alkyleneimino, aza-, oxa- or thiaakyleneimino, such as, dimethylamino, diethylamino, di-n-propylamino or di-n-butylamino; pyrrolidino, piperidino, N-lower-alkylpiperazino, morpholino or thiamorpholino. A halogen atom R advantageously stands for bromine. The hydrolysis of said enamines is preferably carried out in an acidic medium, such as an aqueous acid, for example a mineral acid or a strong organic acid, such as a hydrohalic acid, e.g. hydrochloric, hydrobromic or hydriodic acid, perchloric, sulfuric or phosphoric acid, a sulfonic acid, such as a lower alkane or benzene sulfonic acid, e.g. methane, ethane, or p-toluene sulfonic acid. The hydrolysis of the corresponding halo compound, is preferably carried out in an alkaline medium, for example, an aqueous alkali metal hydroxide or carbonate, e.g. sodium or potassium hydroxide or carbonate, an alkali metal alkanolate, e.g. that mentioned above or any other agent suitable for the hydrolysis of unsaturated halogen compounds.

The compounds mentioned under (c) can be isomerized into the corresponding β-hydroxy-acrylonitriles by the action of alkaline agents, e.g. those mentioned hereinbefore, advantageously with an alkali metal lower alkanolate.

An enolether or ester of the starting material mentioned under (d) is, for example, such mentioned for the final products. A halogen atom therein stands preferably for chlorine or advantageously bromine. These compounds are reacted with a cyanide, preferably an alkali metal or ammonium cyanide, or a reactive functional derivative of formic acid, such as an ester or orthoester thereof, derived preferably of an aliphatic or araliphatic alcohol, or a formamide.

A reactive metal derivative of the starting material mentioned under (e) is, for example, an alkali metal, e.g. sodium or potassium, derivative thereof. The halocyan, haloformiate or halooxalate used as reactant is advantageously the chloro or bromo compound. The decarbonylation of a glyoxalate obtained may be performed by pyrolysis, advantageously in vacuo.

Any free compound obtained may be converted into one of said enol and/or carboxylic acid derivatives thereof according to methods known per se. For example any free enol may be etherified, for example, with a reactive functional derivative of an aliphatic or araliphatic alcohol, such as its ester with a hydrohalic or sulfuric acid, or esterified with a reactive functional derivative of a corresponding acid, such as an anhydride or halide thereof. From a free acid a salt, an ester or amide may be prepared according to known methods, in order to obtain the derivatives mentioned in the beginning.

Alternatively any derivative obtained may be converted into the free compounds, for example, esters, ethers, amides or nitriles by hydrolysis, or into another derivative, for example, nitriles into amides by partial hydrolysis, esters into other esters by transesterification, substituted amides by reaction of the unsubstituted amides with a reactive ester of an alcohol, preferably a hydrohalic acid ester of a lower alkanol, acids or acid derivatives into amides, for example, by reaction of esters, anhydrides or acid halides with ammonia or amines. Also in the heterocyclic moiety a substituent, such as a lower alkyl group, may be added to a nitrogen atom present, for example, as shown for the substituted amides above.

The final products are obtained in the free form or in the form of their ammonium or metal salts (derived either from the acid or the enol), or acid addition salts respectively (derived from any basic heterocycle) depending on the conditions under which the process is carried out; the salts are also included in the present invention. Salts that are obtained can be converted into the free compounds for example, by reacting them with an acidic or basic agent respectively, such as a mineral acid or strong organic acid, e.g. those mentioned above, or a metal hydroxide, e.g. sodium, potassium or calcium hydroxide, an alkali metal carbonate, e.g. sodium or potassium carbonate or hydrogen carbonate, ammonia or a hydroxyl ion exchange preparation.

A resulting salt may also be converted into another salt, for example by its treatment with a suitable ion exchange preparation. Furthermore, a salt may be converted into another salt which is less soluble in the particular solvent used, for example by reacting it with an acid or base respectively, or a soluble salt thereof.

A free acid is converted into its salts, especially its ammonium, alkali or alkaline earth metal salts, e.g., sodium, potassium or calcium salts, by reaction with a corresponding hydroxide, carbonate, hydrogen carbonate or cation exchange preparation.

A free base is converted into a salt thereof, by its treatment with an acid or an anion exchange preparation. Preferred salts are those of therapeutically useful acids, such as inorganic acids, e.g. hydrochloric, hydrobromic, nitric, sulfuric or phosphoric acid, or organic acids, such as carboxylic or sulfonic acids, e.g. acetic, propionic, glycolic, malonic, succinic, maleic, hydroxymaleic, fumaric, malic, tartaric, citric, glucuronic, benzoic, salicylic, 4-aminosalicylic, 2-acetoxybenzoic, pamoic, nicotinic, isonicotinic, methane sulfonic, ethane sulfonic, ethane 1,2-disulfonic, 2-hydroxyethane sulfonic, benzene sulfonic, toluene sulfonic or naphthalene 2-sulfonic acid, methionine, lysine, tryptophan or arginine. Other acid addition salts are useful as intermediates for the preparation of the pure parent compounds or in the manufacture of other salts, as well as for identification or characterization purposes. Addition salts primarily used for the latter are, for example, those with certain inorganic acids, e.g. perchloric, phosphotungstic, phosphomolybdic, chloroplatinic or Reinecke acid or with acidic organic nitro compounds, e.g. picric, picrolonic or flavianic acid. The bases are converted into salts, the salts are separated and the bases liberated from the salts. In view of the close relationship between the free compounds and the compounds in the form of their salts, whenever a free compound is referred to in this context, a corresponding salt is also intended, provided such is possible and useful.

Resulting mixtures of isomeric compounds may be separated into single isomers based, for example, on physicochemical differences, such as different solubilities or different boiling points. Thus, mixtures of isomers of racemates may be separated by fractional crystallization or fractional distillation, if necessary, by using a derivative thereof, e.g. a salt. Racemic products can likewise be resolved into the optical antipodes, for example, by reaction with optically active acids, separation of the diastereomeric salts and liberation of the bases from the salts.

The above-mentioned reactions are carried out according to standard methods, in the presence or absence of diluents, preferably such as are inert to the reagents and are solvents thereof, of catalysts, condensing agents and/or inert atmospheres, at low temperatures, room temperature or elevated temperatures, at atmospheric or superatmospheric pressure.

The invention further includes any variant of the present process in which an intermediate product obtainable at any stage thereof is used as starting material and any remaining step or steps is/are carried out or the process is discontinued at any stage thereof or in which the starting materials are formed in situ or the reactants are used in the form of their salts. The present reactions are preferably performed with starting materials that give rise to the preferred compounds mentioned above.

The starting materials used are known or, if new, may be prepared according to known procedures. The enamine shown under (b) may be obtained by reaction of a compound having the formula

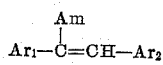

in which Am stands for a tertiary amino group, preferably pyrrolidino, with bromocyan or a lower alkyl bromoformiate [see, for example, J. Amer. Chem. Soc. 81, 5400 (1959)]. Alternatively such starting materials may be prepared by reacting a Grignard derivative of the acid $Ar_1$—$CH_2$—COOH (Ivanov reagent) with the nitrile $Ar_2$—CN. The corresponding halo-compounds may be prepared by reacting a trihalide $Ar_1$—C(Hal)$_3$ with an ester, amide or the nitrile of the acid $Ar_2$—$CH_2$—COOH.

The compounds shown under (c) can be prepared by formylations of those shown under (e), for example with the use of a lower alkyl formiate or orthoformiate under Claisen conditions, and reacting the resulting hydroxymethylene compounds with hydroxylamine in order to obtain the desired isoxazoles.

The compounds shown under (d) can be prepared by halogenation of the corresponding unsubstituted compounds, either with a halogen itself or with the use of a halogenating agent, such as an N-halogenimide, e.g. N-bromo-succinimide.

The compounds of this invention are useful in the form of compositions, especially for enteral, e.g. oral use, which contain a pharmacologically effective amount of the active compound of this invention in admixture with a pharmaceutically acceptable organic or inorganic, solid or liquid carrier. For making up the latter, there are employed the usual carrier materials suitable for the manufacture of pharmaceutical compositions, such as water, gelatin, sugars, e.g. lactose, sucrose or glucose, starches, e.g. corn starch, wheat starch or rice starch, stearic acid or salts thereof, e.g. magnesium or calcium stearate, talc, vegetable oils, ethanol, stearyl alcohol, benzyl alcohol, gums, acacia, tragacanth, polyalkylene glycols, propylene glycol or any other suitable excipient or mixtures thereof. The compositions may be in solid form, e.g. capsules, tablets, dragees or suppositories, or in liquid form, e.g. solutions, suspensions or emulsions. If desired, they may contain auxiliary substances, such as preserving, stabilizing, wetting, emulsifying, coloring or flavoring agents, salts for varying the osmotic pressure and/or buffers. The above preparations are prepared according to the standard method used for the manufacture of pharmaceutically acceptable compositions, which, if desired, may also contain, in combination, other physiologically useful substances.

The following examples are intended to illustrate the invention and are not to be construed as being limitations thereon. Temperatures are given in degrees centigrade and all parts are parts by weight.

*Example 1*

5.6 g. sodium are dissolved in methanol and most of the excess methanol is removed under reduced pressure. To the concentrated stirred sodium methoxide solution 26.2 g. 4 - methylphenyl - acetonitrile and 33.2 g. ethyl nicotinate are added. After the red solution has been stirred for 1.3 hours, it becomes a thick, yellow suspension. This is allowed to stand at room temperature for 2½ days, protected from moisture. Water is then added, and the aqueous enolate solution is washed with diethyl ether and slowly neutralized in the cold with 18% hydrochloric acid. The first crop of reddish crystals, after collecting, washing with water and air drying, melts at 183–189°. Later crops of crystalline material obtained after further addition of hydrochloric acid to the filtrate, are less discolored (pink-yellow) and melt a 185–188°. The first crop is recrystallized twice and the combined following crops once from ethanol to yield the α-(4-methylphenyl) - β - hydroxy - β - (3 - pyridyl) - acrylonitrile of the formula

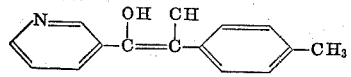

melting at 189–191°. It gives with ferric chloride the usual weak greenish color and shows in the infrared spectrum peaks at 4.55 and 6.19μ.

*Example 2*

Using the same conditions as described in Example 1 27.0 g. 4 - fluoro - phenyl - acetonitrile are acylated with 33.2 g. ethyl nicotinate in the presence of sodium methoxide, prepared from 5.1 g. sodium. The initially deep purple solution becomes greenish, and solidifies on stirring and is allowed to stand overnight. The crude product obtained after neutralization with hydrochloric acid represents orange crystals melting at 212–216°. After recrystallization from ethanol there is obtained the pure α - (4 - fluoro - phenyl) - β - hydroxy - β - (3 - pyridyl)-acrylonitrile of the formula

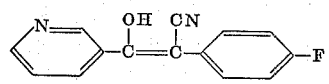

melting at 220–223°.

*Example 3*

A mixture of 26.0 ethyl nicotinate and 18.2 g. 4-chlorophenyl - acetonitrile is added dropwise to an ethanolic solution of sodium ethoxide, prepared from 50 ml. of anhydrous ethanol and 7.1 g. of a 52% sodium hydride suspension in mineral oil. The reaction mixture becomes warm and orange-colored and is heated under reflux for 4 hours. It is poured into water, the mixture acidified with 2 N hydrochloric acid and the orange colored crystalline precipitate is collected. It is recrystallized from aqueous ethanol to yield the α - (4 - chloro - phenyl) - β - hydroxy-β - (3 - pyridyl) - acrylonitrile of the formula

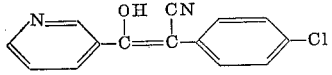

melting at 217–219°.

*Example 4*

To an ethanolic solution of sodium ethylate, prepared from 1.7 g. sodium and 25 ml. absolute ethanol, 13.0 g. ethyl nicotinate and 9.1 g. 3 - chloro - phenyl - acetonitrile are added. The reaction mixture is refluxed for 4 hours, poured into water and extracted once with diethyl ether. The extract is rejected and the aqueous layer acidified with dilute acetic acid and the yellow precipitate formed collected. The crude material melts at 155–160°. It is recrystallized from aqueous ethanol to yield the α - (3-chloro - phenyl) - β - hydroxy - β - (3 - pyridyl) - acrylonitrile of the formula

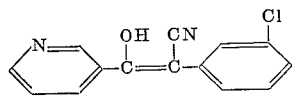

melting at 188–190°.

*Example 5*

3.7 g. ethyl 4-chloro-benzoate and 1.65 g. 3-pyridyl-acetonitrile are refluxed for 4 hours in an ethanolic sodium ethoxide solution prepared from 8 ml. anhydrous ethanol and 0.83 g. of a 52% suspension of sodium hydride in mineral oil. The reaction mixture is poured into water, the solution acidified with dilute acetic acid and the crystalline precipitate collected. It is recrystallized from ethanol to yield the α - (3 - pyridyl) - β - hydroxy - β - (4 - chloro-phenyl) - acrylonitrile of the formula

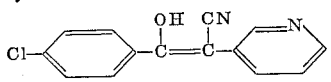

melting at 248–250°.

*Example 6*

To a suspension of sodium methoxide (prepared from 7.0 g. sodium and evaporation of the methanolic solution in vacuo) in dry diethyl ether, 32.2 g. 3 - pyridyl - acetonitrile and 45.0 g. ethyl benzoate are added with stirring. After 3 hours stirring the mixture, from which a gummy yellow-brown salt soon begins to separate, is allowed to stand at room temperature overnight. Addition of cold water, sufficient to dissolve the brown salt, is followed by separation of the aqueous solution, and addition of 18% hydrochloric acid to the latter, until a pH of about 6 is reached. The aqueous solution is kept at 0° overnight, and the crystals formed are collected, washed with water, and dried. This first crop of reddish crystals consists primarily of α - (3 - pyridyl) - β - hydroxy - β - phenyl-acrylonitrile of the formula

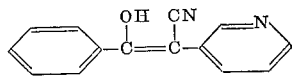

which after trituration with diethyl ether, retains reddish discoloration and melts at 180–200°. It is recrystallized from methanol yielding yellow crystals melting at 245–247° (dec.)

Its infrared spectrum (Nujol) shows peaks at 4.57 and 6.45μ and the ultraviolet spectrum (methanol) shows a λ$_{max.}$ at 224, 238, 281 and 332 mμ, ε=11,900, 12,200, 7,700 and 13,600 respectively.

From the ether filtrate, after trituration of the above product, as well as from the original neutralized aqueous solution, on standing for several days at room temperature, there is obtained the lower melting α,γ-bis-(3-pyridyl)-β-aminocrotonitrile, which upon trituration with diethyl ether and recrystallization from the same solvent forms colorless crystals melting at 117–119.5°.

*Example 7*

5.0 g. of α - phenyl - β - hydroxy - β - (3 - pyridyl)-acrylonitrile was treated for 1 hour at room temperature with 25 ml. concentrated sulfuric acid while stirring. The reaction mixture is poured over ice to give a yellow solution. It is neutralized with solid sodium hydrogen carbonate causing a yellow gummy solid to precipitate. After standing overnight it is filtered off, washed with water and the so-obtained α-phenyl-β-hydroxy-β-(3-pyridyl)-acrylic acid amide of the formula

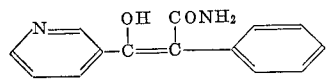

is recrystallized from methanol-diethyl ether, M.P. 136–138°.

*Example 8*

Using in Example 1 instead of 4-methyl-phenyl-acetonitrile the equivalent amount of ethyl 4-methyl-phenyl-acetate, the ethyl α-(4-methyl-phenyl)-β-hydroxy-β-(3-pyridyl)-acrylate is obtained. Accordingly, the nitrile, amide and ethylester of the following acids can be obtained by following the procedure shown in the previous examples:

α - (4 - methoxy - phenyl) - β - hydroxy - β - (3-pyridyl) - acrylic acid, α - (2 - furyl or thienyl) - β - hydroxy - β - (1 - naphthyl) - acrylic acid, α - phenyl - β-hydroxy - β - (3 - quinolyl) - acrylic acid, α - phenyl-β - hydroxy - β - (1 - methyl - 2 - pyrryl) - acrylic acid, α - (4 - quinolyl) - β - hydroxy - β - (4 - chloro - phenyl)-acrylic acid, α - (4 - methoxy - phenyl) - β - hydroxy-β - (4 - isoquinolyl) - acrylic acid and α - (2 - naphthyl)-β - hydroxy - β - (3 - pyridyl) - acrylic acid.

*Example 9*

To the solution of sodium ethoxide, made from 1.7 g. sodium and 25 ml. absolute ethanol, the solution of 14.3 g. methyl 2-methoxy-benzoate in 7.1 g. 3-pyridyl-acetonitrile is added dropwise while stirring. After 4 hours reflux the reaction mixture is poured into water, extracted with diethyl ether, the aqueous layer is acidified with acetic acid and the orange precipitate formed collected. It is recrystalized from n-butanol to yield the α - (3-pryidyl) - β - hydroxy - β - (2 - methoxy - phenyl)-acrylonitrile of the formula

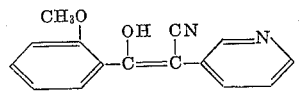

melting at 220–221°.

*Example 10*

21.2 g. ethyl 4-dimethylamino-benzoate are dissolved in 10.6 g. warm 3-pyridyl-acetonitrile and the solution added portionwise to the stirred sodium ethoxide solution made from 2.4 g. sodium and 35 ml. absolute ethanol. The mixture is stirred and refluxed for 4 hours and allowed to stand overnight at room temperature. Hereupon it is poured into 150 ml. water, extracted with diethyl ether and the aqueous layer adjusted to pH 6 with 2 N-hydrochloric acid. On standing yellow crystals separate and the pH rises to 8. It is kept at 6 with additional 2 N-hydrochloric acid. The crystals representing the α-(3-pyridyl)-β - hydroxy - β - (4 - dimethylamino - phenyl) - acrylonitrile of the formula

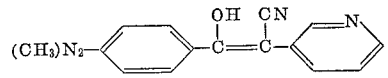

are collected and recrystallized from acetone, M.P. 165–166°.

*Example 11*

To the solution of sodium ethoxide, made from 1.1 g. sodium and 20 ml. absolute ethanol, the solution of 8.65 g. ethyl nicotinate and 10.8 g. 4-[2-(4-chloro-phenyl)- propyl-2-]-phenylacetonitrile is added dropwise while stirring and the mixture is refluxed for 3 hours. Hereupon it is poured into water, extracted with diethyl ether and the aqueous solution acidified with acetic acid. The precipitated oil solidifies slowly. It is filtered off and recrystallized from aqueous ethanol to yield the α-{4-[2-(4-chlorophenyl) - propyl - 2] - phenyl} - β - hydroxy - β - (3-pyridyl)-acrylonitrile of the formula

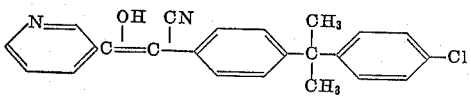

melting at 131–135°.

*Example 12*

In the analogous manner described in the previous examples, the following compounds can be prepared: α-phenyl - β - hydroxy - β - (4 - thiazolyl) - acrylonitrile, α - (4 - trifluoromethyl - phenyl) - β - hydroxy - β - (2-methyl - thiazolyl - 4) - acrylonitrile, α - phenyl - β-hydroxy - β - (2 - thienyl) - acrylonitrile, α - phenyl - β-hydroxy - β - (3 - pyrazolyl - acrylonitrile, α - (4 - methyl-phenyl) - β - hydroxy - β - (5 - methyl - pyrazolyl - 3)-acrylonitrile and α - (2 - thienyl) - β - hydroxy - β - phenyl-acrylonitrile.

What is claimed is:

1. A member selected from the group consisting of a compound having the formula

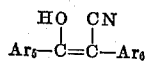

in which $Ar_5$ stands for a member selected from the group consisting of phenyl, (lower alkyl)-phenyl, (lower alkoxy)-phenol, (halogeno)-phenyl and (trifluoromethyl)-phenyl and $Ar_6$ for a member selected from the group consisting of 2-pyridyl, 3-pyridyl, 4-pyridyl, (lower alkyl)-2-pyridyl, (lower alkyl)-3-pyridyl and (lower alkyl)-4-pyridyl, an alkali metal salt and therapeutically acceptable acid salt thereof.

2. A member selected from the group consisting of a compound having the formula

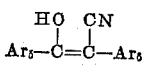

in which one of $Ar_5$ stands for a member selected from the group consisting of (lower alkyl)-2-pyridyl, (lower alkyl)-3-pyridyl and (lower alkyl)-4-pyridyl and $Ar_6$ for a member selected from the group consisting of phenyl, (lower alkyl)-phenyl, (lower alkoxy)-phenyl, (halogeno)-phenyl and (trifluoromethyl)-phenyl, an alkali metal salt and therapeutically acceptable acid addition salt thereof.

3. A member selected from the group consisting of a compound having the formula

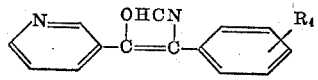

in which $R_4$ stands for a member selected from the group consisting of lower alkyl, lower alkoxy, halogeno and trifluoromethyl, an alkali metal salt and therapeutically acceptable acid addition salt thereof.

4. α - (4 - methyl - phenyl) - β - hydroxy - β - (3-pyridyl)-acrylonitrile.

5. α - (4 - fluoro - phenyl) - β - hydroxy - β - (3-pyridyl)-acrylonitrile.

6. α - (4 - chloro - phenyl) - β - hydroxy - β - (3-pyridyl)-acrylonitrile.

7. α - (3 - chloro - phenyl) - β - hydroxy - β - (3-pyridyl)-acrylonitrile.

8. α - (3 - pyridyl) - β - hydroxy - β - (4 - chlorophenyl)-acrylonitrile.

9. α - (3 - pyridyl) - β - hydroxy - β - phenyl - acrylonitrile.

10. α - (3 - pyridyl) - β - hydroxy - β - (2 - methoxyphenyl)-acrylonitrile.

11. α - (3 - pyridyl) - β -hydroxy - β - (4 - dimethylaminophenyl)-acrylonitrile.

12. α - {4 - [2 - (4 - chloro - phenyl) - propyl - 2]-phenyl}-β-hydroxy-β-(3-pyridyl)-acrylonitrile.

References Cited

Russel et al., Chem. Abstracts, vol. 48, par. 1056–2, (1954).

Russel, J. Am. Chem. Soc., vol. 74, pp.2654–6 (1951).

Burger, Medicinal Chemistry, 2nd ed., Interscience (1960), pp. 75 and 78.

WALTER A. MODANCE, *Primary Examiner.*

A. ROTMAN, *Assistant Examiner.*